United States Patent [19]

Fleigle

[11] 4,064,680
[45] Dec. 27, 1977

[54] CORDLESS TWIN BLADE LAWNMOWER CONSTRUCTION

[75] Inventor: Donald Earl Fleigle, Middle River, Md.

[73] Assignee: The Black and Decker Manufacturing Company, Towson, Md.

[21] Appl. No.: 603,250

[22] Filed: Aug. 8, 1975

[51] Int. Cl.² ............................................. A01D 55/18
[52] U.S. Cl. ...................................... 56/11.9; 56/13.6; 56/320.2
[58] Field of Search ................... 56/11.9, 320.1, 320.2, 56/13.6, 202, 255, 295, 10.6, 10.5, 17.5, 6

[56] References Cited

U.S. PATENT DOCUMENTS

| 2,071,872 | 2/1937 | Cockburn | 56/295 X |
|---|---|---|---|
| 2,791,876 | 5/1957 | Flanigan | 56/10.6 |
| 2,836,024 | 5/1958 | Davis et al. | 56/255 X |
| 2,909,885 | 10/1959 | Smith | 56/11.9 |
| 3,028,719 | 4/1962 | Jepson | 56/295 |
| 3,157,014 | 11/1964 | Bottenberg | 56/6 |
| 3,220,170 | 11/1965 | Smith et al. | 56/320.2 X |
| 3,485,018 | 12/1969 | Beckering et al. | 56/13.6 |
| 3,568,421 | 3/1971 | Smith et al. | 56/202 X |
| 3,608,291 | 9/1971 | Kidd | 56/320.1 |

Primary Examiner—Jay N. Eskovitz
Attorney, Agent, or Firm—Edward D. Murphy; Leonard Bloom

[57] ABSTRACT

A cordless twin blade electric lawnmower having substantially improved performance and efficiency is disclosed. The lawnmower includes a pair of spaced counter-rotating cutting blades, a pair of motors driving each of the respective blades and a battery for energizing the motor under the control of a switch. The housing of the lawnmower is supported on wheels and provides a passageway comprising a helical convolute for each of the respective blades. The two convolutes join in the center of the mower and provide a continuing passageway into a rear mounted bag. The front of the bag is partially closed by a chute which, when the bag is not present, automatically falls into a guard position wherein all air flow, objects and grass are directed downwardly at the rear of the motor. The guard also provides, in this position, for distribution of the grass across the width of the mower span.

4 Claims, 7 Drawing Figures

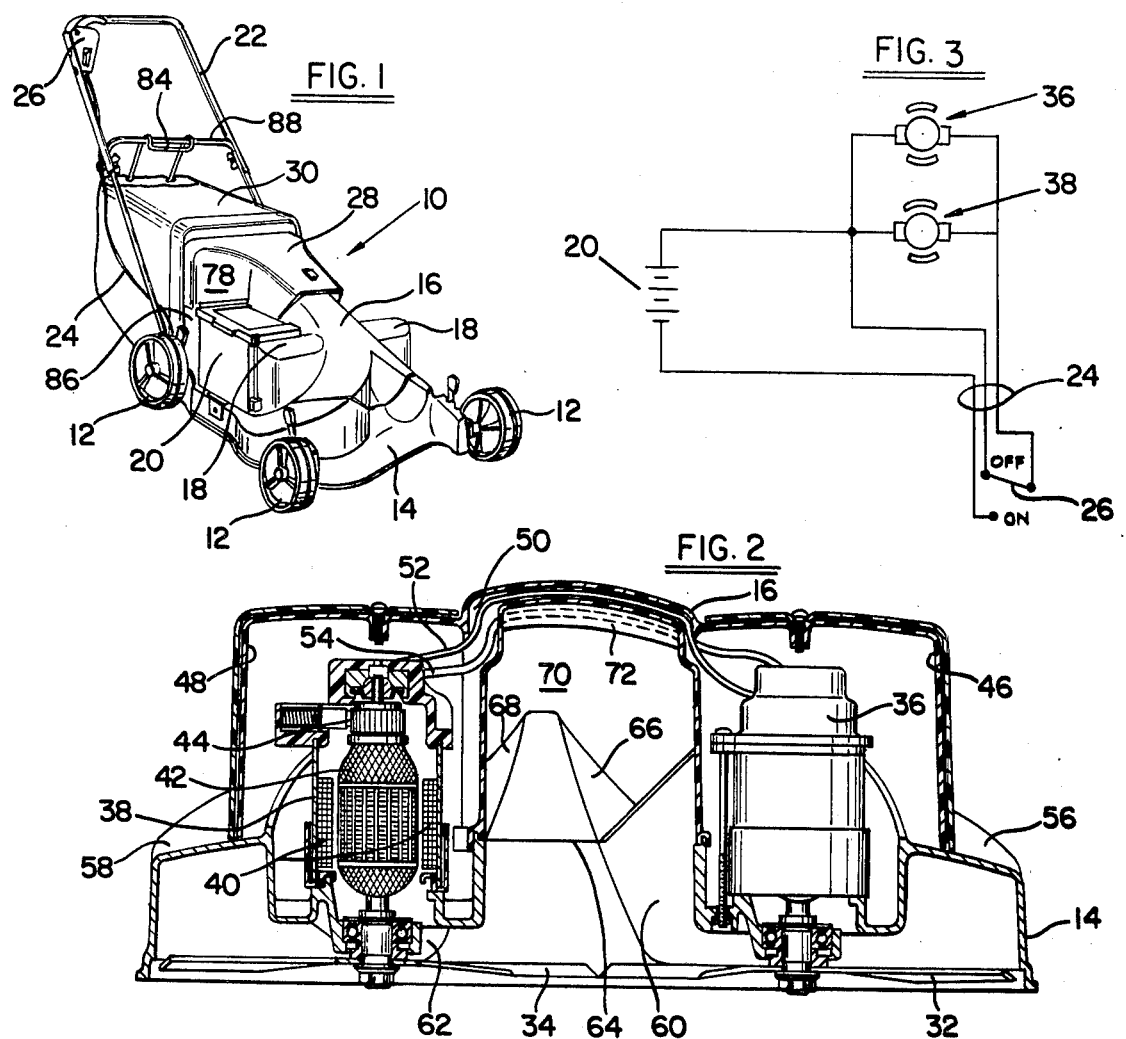
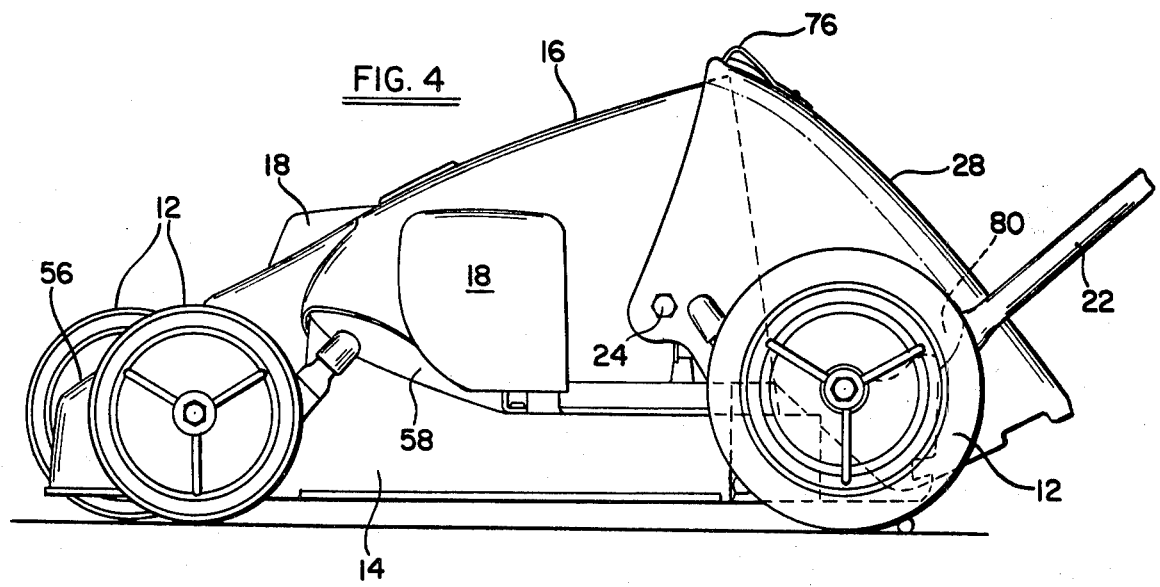

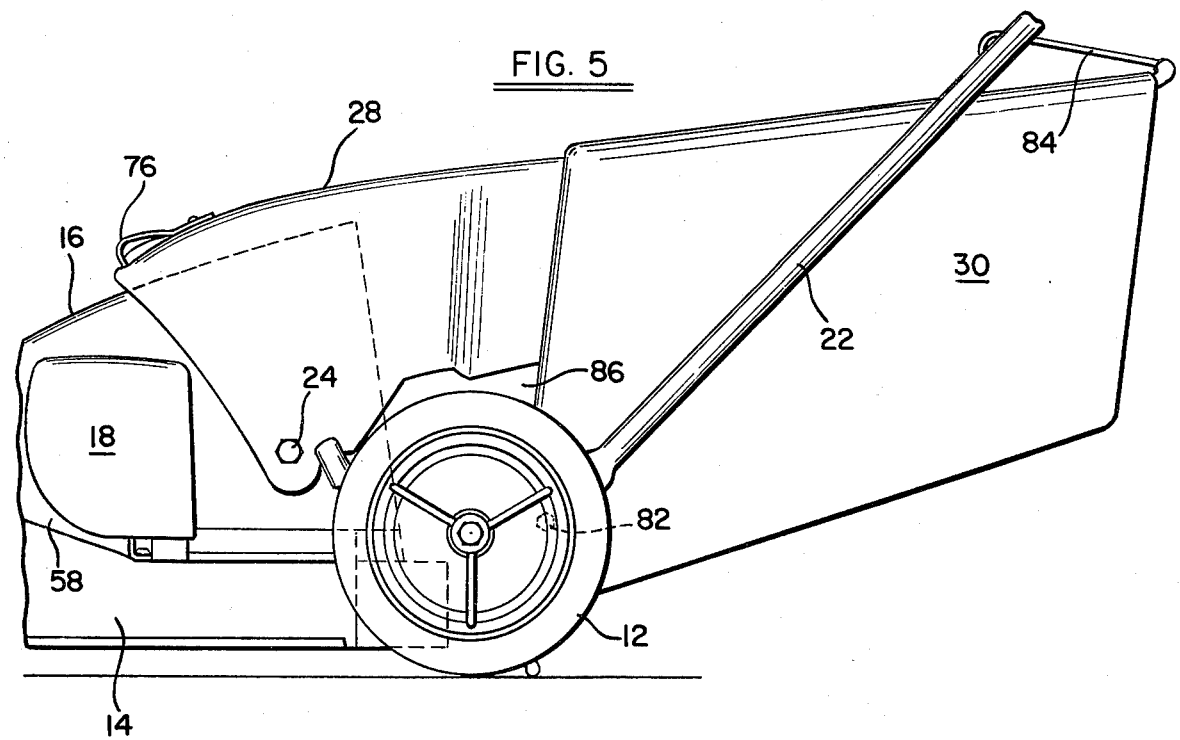
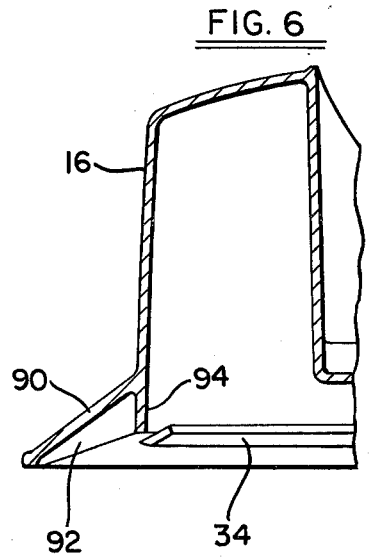
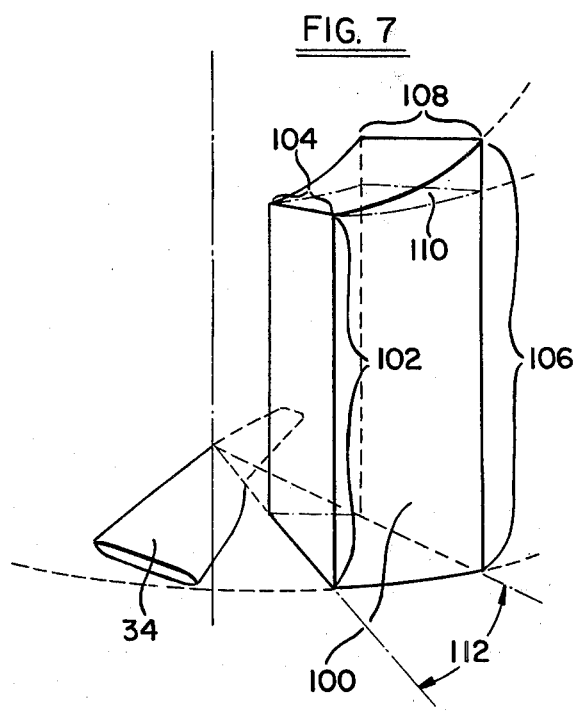

CORDLESS TWIN BLADE LAWNMOWER CONSTRUCTION

The present invention is directed to an improved cordless electric rotary lawnmower which utilizes a battery but which is capable of substantially improved performance in contrast to previous cordless lawnmowers. The mower in accordance with this invention is capable of improved cutting, vacuuming and bagging action for an increased period of time relative to a given battery capacity.

BACKGROUND

While several previous attempts have been made to develop cordless electric lawnmowers, these attempts have not been successful. This has been true despite the fact that, within the last several years, batteries of improved capacity and characteristics have become available. Essentially, these failures have been due to the fact that the designs basically relied on conventional power lawnmower engineering and no constructions have been proposed which could be successfully combined with a battery powered arrangement. Accordingly, the purpose of this invention is to provide a new and improved lawnmower construction which is uniquely capable of providing adequate battery powered performance.

BRIEF SUMMARY

The present invention concerns a battery-operated lawnmower which utilizes two independent motors to drive a pair of independent rotating blades. Each of the blades is provided within a chamber on the underside of the deck which is shaped to define a helical convolute having a harmonic rise; that is, the volume of the chamber from the beginning of the cutting arc of each blade to the end of the cutting arc (i.e., essentially the forward 180° of blade travel) increases at a rate such that it can accept the volume of air introduced into it by the fanning action of the blade without decrease in air speed. Thus, as the blade travels through an incremental portion of arc, an incremental volume of air is introduced into the passage by the blade and the volume of the passage over the same incremental arc increases by just the amount necessary to accept that incremental volume of air.

Preferably, this harmonically rising structure is continued through the point at which the two passages from each blade join and also continues to the point at which the air stream moves the grass clippings into the collection bag at the rear of the lawnmower. Also, in accord with the preferred embodiment, the blades used in conjunction with this concept are of air foil configuration so as to provide air flow and grass lift with maximum efficiency and, in combination with the passages, to provide for adequate performance in the context of battery power.

A further specific feature of this invention is the provision of an improved shrouding arrangement at the tips of blades through the cutting arc which further enhances the cutting and bagging performance as well as the overall efficiency.

Another specific feature of the present invention is the provision of a two piece deck which accommodates the above-described passage configuration without excessive manufacturing difficulty.

In another aspect, this invention is concerned with the overall design and placement of the above-identified elements in a unique and compact arrangement which combines these features into a convenient structure without sacrificing performance.

It is accordingly an object of the present invention to provide a new and improved cordless electric rotary lawnmower.

A further object of the present invention is the provision of a unique twin blade rotary structure which provides unexpectedly improved cutting, vacuuming and bagging performance.

Another object is the provision of a cordless lawnmower which incorporates various structural elements which provide improved performance into a unique and compact overall configuration.

It is also an object of this invention to provide a cordless electric lawnmower of improved performance characteristics which, at the manufacturing level, can readily be converted to a corded lawnmower of exceptional performance capability.

Further objects and advantages of this invention will become apparent as the description and illustration thereof proceed.

IN THE DRAWINGS

FIG. 1 is a perspective view of a lawnmower constructed in accordance with the present invention;

FIG. 2 is a sectional view taken diagonally through the deck and motor region of the lawnmower of FIG. 1;

FIG. 3 is a schematic illustration of the circuit used in the mower of FIG. 1.

FIG. 4 is a side elevation of the lawnmower of FIG. 1 but shown in the non-bagging configuration;

FIG. 5 is a partial side elevation of the lawnmower of FIG. 1 in the bagging configuration;

FIG. 6 is a sectional view taken through one convolute and one blade of the mower of FIG. 1 at the leading edge of the lawnmower; and FIG. 7 is a schematic view of a portion of one convolute of the mower of FIG. 1.

In FIG. 1, a cordless twin blade lawnmower in accordance with the present invention is illustrated. The lawnmower 10 comprises a plurality of wheels 12 which support a metallic deck 14. The enclosure of the discharge path is completed by a shroud 16, preferably of plastic and a pair of motor covers 18 are provided to enclose the electric motors. The deck also supports a battery 20 and a handle 22. Cable 24 and switch 26 provide for operator control of the energization of the motors from the battery. As is also shown in FIG. 1, a guard 28 and bag 30 provide for either bagging or non-bagging operation.

FIG. 2 is a diagonal cross section taken through the center line of the motors and looking forwardly of the mower, certain parts being left in elevation. In this view, it can be seen that the deck 14 encloses a pair of blades 32, 34 which are respectively driven by motors 36 and 38. The motors are preferably of the permanent magnet type and include field magnets 40, and armature 42 and a pair of brushes, one of which is illustrated at 44. Each of the motors is supported in conventional bearings and the motor assembly is mounted to the deck 14 by suitable mounting bolts 46. The two motors correspond exactly except that the direction of rotation thereof is opposite so that both blades cause an air flow from the outside of the deck toward the inside and into the discharge chute defined by shroud 16.

It is noted that FIG. 2 is a diagonal view. The blades are positioned to cut overlapping swathes as the mower is moved forward and the diagonal offset is required to prevent the blades from striking one another.

The interior of the shroud 16 is also shown in FIG. 2. The shroud includes side portions 46, 48 which enclose the motors and a top, double-wall portion defines a passageway 50 for wires 52, 54 which extend between the motors. In addition, the undersurface of the shroud is shaped so as to cooperate with the upper portion of the deck 14 and define the respective helical convolutes for the blades and the discharge passage extending toward the rear of the motor. Thus, the casting includes a pair of helically rising upper surfaces 56, 58 and inner surfaces 60, 62 which define the initial convolute portion. This can be more clearly understood from a consideration of the external shape of the deck as shown in FIG. 1. The deck terminates along line 64 and the shroud 16 continues the definition of the helical convolutes via internal surfaces 66, 68 until these join in a common passageway 70 through which the air flow and grass clippings are directed toward the rear of the mower. The continuing rise of this passage can be seen from a consideration of FIG. 1 and of the downward taper of the underside of this surface shown at 72 in FIG. 2 which is a view toward the front of the mower.

FIG. 3 is a schematic illustration of the circuit of this mower. Specifically, the motors 36, 38 are wired in parallel and are connected via cable 24 so as to be connected to the battery 20 for energization when the switch 26 is turned on or to be shorted for braking action when the switch is turned off.

FIG. 4 is a side elevation of the lawnmower of this invention. In this illustration, the guard 28 is in its protective position, it being spring biased by a torsion spring about pivot point 74 to fall into the protective position whenever the bag is removed. A spring clip 76 functions as a latch to secure the guard in the protective position until it is positively released by the operator to raise it for installation of the bag.

From a consideration of FIGS. 1 and 4, it will be seen that the guard is shaped so as to conform to the rear portion of the shroud 16 so that, in the bagging mode, the guard smoothly fits over the shroud 16. In the non-bagging position, the guard pivots to its protective position and, at this point, the discharge passage is completed within the guard. In order to avoid unsightly clumping or windrowing of grass clippings in this configuration, the rear portion of the guard is flared to the sides, as shown at 78 in FIG. 1 and, correspondingly, at 80 in FIG. 4.

FIG. 5 illustrates a partial side elevation of the lawnmower of FIG. 1 wherein the guard is in the raised position and the bag 30 is attached. The bag may comprise a skeletal metallic frame for holding it in a given configuration, the frame being covered by a porous fabric for collecting and retaining grass clippings while permitting air to escape. The bag is affixed to the lawnmower by suitable means such as hooks, not shown, which engage the lower pivot points of the handle 22, one the pivot points being shown at 82. A bent wire clip 84 may be attached to the frame of the grass bag for detachably mounting the rearward end of the grass bag to a center span 86 of the handle, or other similar means.

It is noted that the grass bag includes a partial cover 88 shown in FIG. 1 which cooperates with the guard to substantially completely close the front end of the bag when the bag is in position on the lawnmower but to permit easy removal of grass clippings from the bag.

FIG. 6 illustrates a particularly important and unique aspect of this invention in the context of cordless lawnmowers. Specifically, conventional lawnmowers frequently run the blade tip closely adjacent the inside of the deck wall to provide a guiding enclosure for air flow generated by the blade. In other cases, an internal shrouding member is disposed within the deck but in the same relative location; namely, extended in an arc which completely encloses the leading tip of the blade as it passes through its cutting region. It has been found that this construction actually causes a condition wherein the blades of grass are bent downwardly away from the mower blade as they pass under the shroud. Thus, as the grass returns to an upright position, the mower blade ends successively chop pieces of the grass blades until the grass is finally upright and cut at the actual running level of the mower blade. When unlimited power is available, this presents no difficulty but in the case of a cordless lawnmower, the energy expended in recutting the grass to several different heights represents a significant loss. A further problem with this construction is that the overlapping shroud of the prior art is a less efficient air shroud and this causes further loss.

FIG. 6 represents a particular improvement which is desirably incorporated in the cordless lawnmower of the present invention, or in other cordless lawnmowers. Specifically, the casting includes an extended portion 90 positioned significantly forward of the blade path and extending, in accord with safety requirements, to a vertical position below that of the blade. An intervening space 92 is then provided followed by a shroud member 94 which may be integral with or extended from the deck. This can be seen in FIG. 6, the shroud is very precisely positioned relative to the blade so that the tip of the blade runs immediately under this shroud wall in very close proximity thereto.

While it is difficult to be certain of the exact function of this configuration, it has been found that the energy expended in cutting grass is substantially reduced thereby. It is believed that this is due to a combination of the two factors noted above, namely, allowing the grass to rise to a sufficiently upright position so that it is cut only once by the blade and the clipped end is immediately introduced into the air passage and delivered to the bag at the rear. Secondly, the air flow required to deliver grass clippings is more efficiently obtained by this construction than by the prior art. It has been found that battery driven mowers having this structure provide a greater cutting time than mowers constructed in accordance with the prior art and it has also been found that the grass clippings tend to be significantly longer, indicating that they have not been subjected to multiple cutting action.

A further aspect of this invention, which is of substantial importance in minimizing the energy lost in wasted or unnecessary effort is the provision of helical convolutes for each blade through the cutting swath and preferably continuing to the grass collection bag. It is also of particular significance that this helical convolute have a volume which increases at a rate sufficient to accept the air introduced by the blade. This condition is illustrated by the schematic view in FIG. 7. As shown therein, the passageway segment above the blade 34 has a generally arcuate cross section corresponding to the path of the blade. At the beginning of the illustrated segment 100, the cross sectional area is defined by the height and width 102 and 104 of the passage. At the end of the segment, the new cross sectional area is defined by the height and width 106 and 108. Assuming, for convenience, that the width 104 equals the width 108, the increase in volume through the segment 100 is that region above the cube having height 102, or in other words, the generally triangular volume 10. In accordance with the present invention, the increase in volume of space available within the passageway over a given segment or increment of arcuate blade travel, for example that defined by the arc 112, is exactly sufficient to accommodate the volume of air transferred into the passageway by the blade passing through this arc at its normal RPM. In other words, the helical convolute has a volume which increases harmonically with the air stream driven by the blade. Operationally, this condition enables the air stream, from the beginning of the cutting swath to the bag, to have a substantially constant velocity. This eliminates point turbulence or other points of increasing or decreasing air velocity, all of which can cause failure of the grass transport, thus allowing grass clippings to fall back into the path of the mower blade where they must be recut and reentrained with additional expenditure of energy.

It is noted that a minor compromsie is necessitated by the fact that the mower design includes two independent motors with overlapping but independent blades. In order to avoid a center strip of grass which would not be cut, the blades must overlap and the centers must therefore be offset relative to the forward motion of the mower. Thus, the forward convolute extends a few degrees further than the rearward convolute at the point of junction between the two. Although their heights should preferably be slightly different at the point of junction, a compromise is adapted for purposes of manufacturing convenience. However, the harmonic rise condition as described above is substantially continued even through this junction as the heights of the two convolutes vary from their theoretical level at this point by less than 10%.

A final aspect of this invention arises from the manner in which the various features found to be useful or critical in a cordless lawnmower have been conformed into a compact and highly functional structure without excessive extensions or unbalances. Within the overall rectangle defined by the wheels, the two independent motors conveniently nest within the helical convolutes required for efficient air and grass movement while the rearward surface of the deck provides for mounting of the battery adjacent the discharge chute and also accommodates the structure 'necessary to provide for either bagging operation or safe, guarded non-bagging operation.

While certain features and advantages of this invention have been illustrated and discussed above. Other advantages as well as further changes and modifications which provide the same advantages will be readily apparent to those skilled in the art without departing from the concept of this invention. It is accordingly intended that the appended claims cover all such changes and modifications as may fall within the true spirit and scope of this invention.

I claim:

1. In a power lawnmower of the type including a housing and a cutting blade adapted to be rotated in a cutting plane within said housing, the improvement comprising a shroud member within said housing disposed above a part of the path of the outer end of said blade, said shroud comprising a semi-cylindrical vertical wall extending circumferentially within the forward portion of said housing at a distance equal to the radius of said blade from the center of rotation of said blade, said wall being located closely adjacent the path of movement of said blade tip and and vertically above said path; a space within said housing disposed ahead of said shroud relative to the normal direction of movement of said mower so that uncut grass is drawn substantially upright by air flow within said mower before it is cut by said blade.

2. The device claimed in claim 1 wherein said housing defines a discharge path above the path of rotation of said blade, said discharge path comprising a helical convolute which increases in volume in the direction of movement of said blade at a rate equal to the rate of air volume being transferred into said discharge path by said blade to assist in drawing grass upright as it is reached by said blade.

3. A cordless electrically operated twin blade lawnmower comprising a housing; a plurality of wheels for supporting said housing; a handle for use by the operator in guiding said lawnmowers; a pair of rotating cutting blades mounted for rotation in a plane beneath said housing; a pair of electric motors, one motor being associated with each of said blades for rotating said blades upon energization of said motors; a battery disposed on said deck; an operator-controlled switch for connecting said motors to said battery; said housing defining a pair of opposite-handed helical convolutes extending above the forward portion of the the path of rotation of said blades and joining in a common, central discharge chute formed in said housing; said motors being respectively located on the center line of said helical convolutes on the upper surface of said housing so that said motors are nested compactly therein; said helical convolute each defining an air path above said blades, the volume of each air path being increased by an incremental amount equal to the volume of air displaced by said blade within an incremental degree of travel when operating at no. load so that air in said convolute moves at a substantially constant velocity; and a shroud member within said housing extending substantially around the forward-most arc of travel of each of said blades, said shroud being positioned immediately above the radial extremity of said blade paths, and an additional segment of said housing extending fowardly of said shroud and downwardly to a point below the plane of rotation of said blades.

4. The device claimed in claim 3 wherein said rate of increase of volume of said convolute differs from said rate of air delivery by not more than 10% throughout the forward 180° of travel of said blade.

* * * * *